United States Patent
Skarpil

(10) Patent No.: US 7,975,562 B2
(45) Date of Patent: Jul. 12, 2011

(54) BELT FORCE MEASURING DEVICE

(75) Inventor: Harry Skarpil, Dortmund (DE)

(73) Assignee: Continental Automotive GmbH, Hannover (DE)

( * ) Notice: Subject to any disclaimer, the term of this patent is extended or adjusted under 35 U.S.C. 154(b) by 210 days.

(21) Appl. No.: 12/310,200

(22) PCT Filed: Aug. 16, 2007

(86) PCT No.: PCT/EP2007/058538
§ 371 (c)(1),
(2), (4) Date: Feb. 13, 2009

(87) PCT Pub. No.: WO2008/020061
PCT Pub. Date: Feb. 21, 2008

(65) Prior Publication Data
US 2009/0199661 A1   Aug. 13, 2009

(30) Foreign Application Priority Data
Aug. 17, 2006   (DE) .................... 10 2006 038 594

(51) Int. Cl.
*G01L 1/04* (2006.01)
(52) U.S. Cl. .............. 73/862.453; 73/862.381
(58) Field of Classification Search .............. 73/161, 73/862.381–862.391, 862.453
See application file for complete search history.

(56) References Cited

U.S. PATENT DOCUMENTS

| 5,996,421 | A | * | 12/1999 | Husby ................. 73/862.451 |
| 7,000,488 | B2 | * | 2/2006 | Ante et al. ............ 73/862.391 |
| 7,007,976 | B2 | | 3/2006 | Ante et al. |
| 7,021,162 | B2 | * | 4/2006 | Ante et al. ............ 73/862.391 |
| 7,263,906 | B2 | * | 9/2007 | Kaijala et al. ........ 73/862.391 |
| 7,347,108 | B2 | * | 3/2008 | Kaijala ................. 73/862.393 |
| 7,415,875 | B2 | | 8/2008 | Ante |

FOREIGN PATENT DOCUMENTS

| DE | 10210330 A1 | 10/2003 |
| DE | 10243344 B4 | 9/2004 |
| DE | 10338057 A1 | 3/2005 |

* cited by examiner

Primary Examiner — Max Noori
(74) Attorney, Agent, or Firm — Cohen Pontani Lieberman & Pavane LLP

(57) ABSTRACT

A belt force measuring device with a measuring spring, the displacement thereof being a measurement for the belt force, and with a transmitter, being assigned to the measuring spring, and with a sensor element, being also assigned to the measuring spring, wherein the displacement of measuring spring, effects a change of position of the sensor element in relation to the transmitter. The change of position is detected by the sensor element as measurement for the belt force and the belt force measuring device further has a first connecting element, connecting the measuring spring with a belt lock or a first belt section and a second connecting element, connecting the measuring spring, with a motor vehicle body or with a component of the motor vehicle body or a second belt section. To provide a belt force measuring device, being produced simply and cost effectively, the measuring spring, the first connecting element and the second connecting element are designated as a single-piece component.

12 Claims, 3 Drawing Sheets

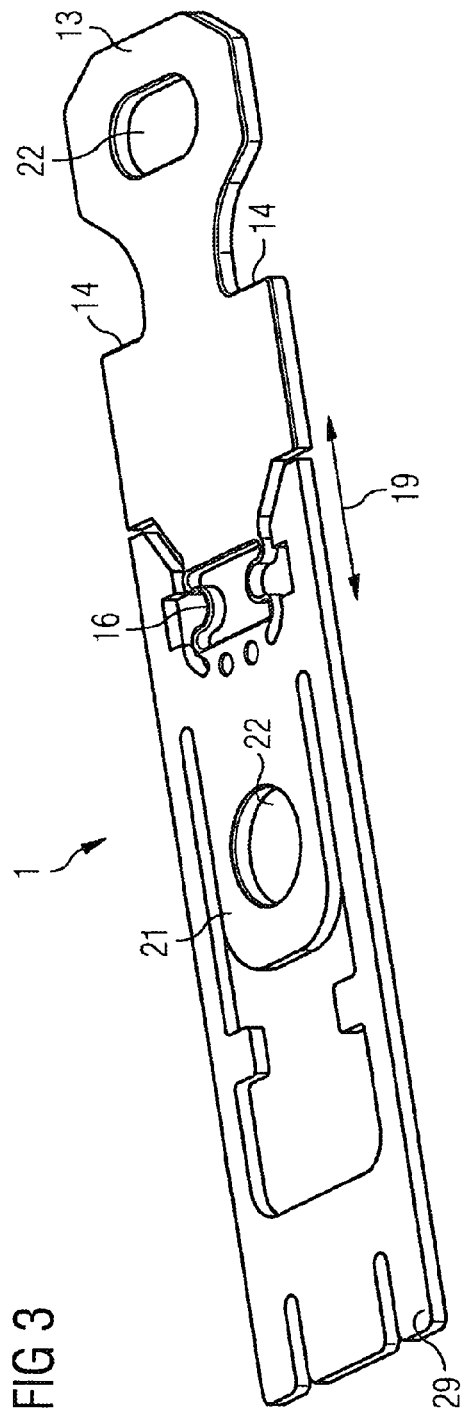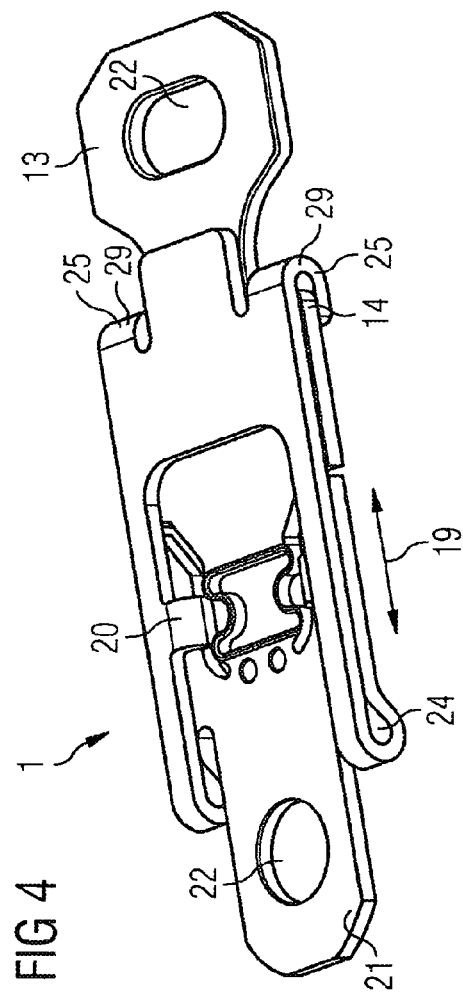

BELT FORCE MEASURING DEVICE

PRIORITY CLAIM

This is a U.S. national stage of application No. PCT/EP2007/058538, filed on 16 Aug. 2007. which claims Priority to the German Application No.: 10 2006 038 594.2, filed, 17 Aug. 2006; the content of both being incorporated here by reference.

BACKGROUND OF THE INVENTION

1. Field of the Invention

The invention relates to a belt force measuring device having a measuring spring whose deflection is a measure of the belt force, and having a transmitter which is associated with the measuring spring, and having a sensor element which is likewise associated with the measuring spring, with the deflection of the measuring spring effecting a change in the position of the sensor element relative to the transmitter, said change being detected by the sensor element as a measure of the belt force, and with the belt force measuring device also having a first connection element, which connects the measuring spring to at least one of a belt lock or a first belt section, and a second connection element which connects the measuring spring to at least one of a vehicle body, a component on the vehicle body, or a second belt section.

2. Description of the Prior Art

To provide improved occupant protection in a vehicle, it is necessary to measure the force a person that is strapped in transmits to the belt. This force is called the belt force. The measured values of the belt force are processed and used in the event of an accident to calculate the optimum activation of belt pretensioners and airbags.

U.S. Pat. No. 6,230,088 discloses a belt lock housing which is connected to a mounting fixed to the body of a vehicle, via a belt force measuring device. The belt force measuring device comprises a first part which is coupled to the belt lock and which has arranged on it a transmitter which is in the form of a magnet. A second part is provided which is coupled to the mounting. A sensor element which is in the form of a GMR sensor is formed on the second part. The first and second parts are coupled to one another via two springs which rest freely in each case. The belt force creates deformation of the measuring spring, with the result that the distance between the transmitter and the sensor element changes, and this is evaluated as a measurement signal for determining the belt force.

DE 102 43 344 B4 discloses a belt force measuring device having a measuring spring whose expansion is used as a measure of the belt force. A belt lock housing, which is connected to a mounting via the belt force measuring device, is fixed to the body of a vehicle. The belt force measuring device comprises a first separate connection element, which is coupled to the belt lock, and a second separate connection element which is coupled to the mounting. The connection elements are coupled to one another via the measuring spring. The belt force measuring device also has a transmitter, which is arranged on the measuring spring in a fixed position in relation to a first bearing of the measuring spring, and a sensor element which is arranged on the measuring spring in a fixed position in relation to a second bearing of the measuring spring. The measuring spring is arranged and formed such that it expands between the first and second bearing as a function of the belt force.

SUMMARY OF THE INVENTION

Belt force measuring devices of this type have the disadvantage that they comprise a large number of individual components which can be connected to one another only at a relatively high cost.

An object of the invention is to provide a belt force measuring device which can be produced in a simple and cost-effective manner.

The object is achieved by at least the features of the independent patent claim. Advantageous refinements of the invention are identified in the subclaims.

When the measuring spring, the first connection element and the second connection element are integrally formed, no assembly of these parts is required. The belt force measuring device can therefore be produced in a very cost-effective and rapid manner.

In one embodiment, the measuring spring, the first connection element, and the second connection element are integrally formed as a stamped sheet metal part. Large numbers of stamped sheet metal parts can be produced in a very simple and low-cost manner.

In a another embodiment, the stamped sheet metal part has at least a first fold. The fold is used to move the stop element into a position in front of the stop. This is required in order to prevent the measuring spring from snapping in the event of excessive loading.

In one embodiment, a stop is formed on the stamped sheet metal part by at least a second fold, said stop preventing the connection elements from moving further one beneath the other when a maximum force is reached. By virtue of this measure, the measuring spring is not loaded any further when the maximum force is reached and the belt force measuring device absorbs the entire belt force without yielding any further.

In one refinement, the first connection element has a lug. The lug serves to connect the connection element to a belt lock, a belt section or the vehicle body. Connections of this type can also be easily produced when the second connection element has a lug.

In one embodiment, a guide is formed on the stamped sheet metal part by a next fold, said guide allowing the connection elements to move one beneath the other in a guided manner. The guide permits very exact movement of the sensor element relative to the transmitter, and this leads to very good measurement results for the belt force.

It is very advantageous when the stamped sheet metal part is in the form of a leadframe on which the sensor element and/or evaluation electronics are/is arranged. As a result, separate cabling of the sensor element and the evaluation electronics is not required. The leadframe is fitted with the sensor element and the evaluation electronics and can likewise be used to conduct signals and current.

Furthermore, it is very advantageous when the stamped sheet metal part with the sensor element which is arranged on it, the transmitter and/or the evaluation electronics are/is encapsulated by a thermoplastic in order to protect against external influences. Thermoplastics can be processed in a very cost-effective manner and they provide high-quality and long-term protection against external influences such as dirt, moisture and mechanical loads.

BRIEF DESCRIPTION OF THE DRAWINGS

Exemplary embodiments of the invention are explained below with reference to the schematic drawing, in which:

FIG. 3 shows the belt force measuring device in its unfolded form as a stamped sheet metal part;

FIG. 4 shows the belt force measuring device known from FIG. 3 in its folded state;

DETAILED DESCRIPTION OF THE PRESENTLY PREFERRED EMBODIMENTS

Elements with an identical structure and function are provided with the same reference symbols throughout the figures.

Figure 1:
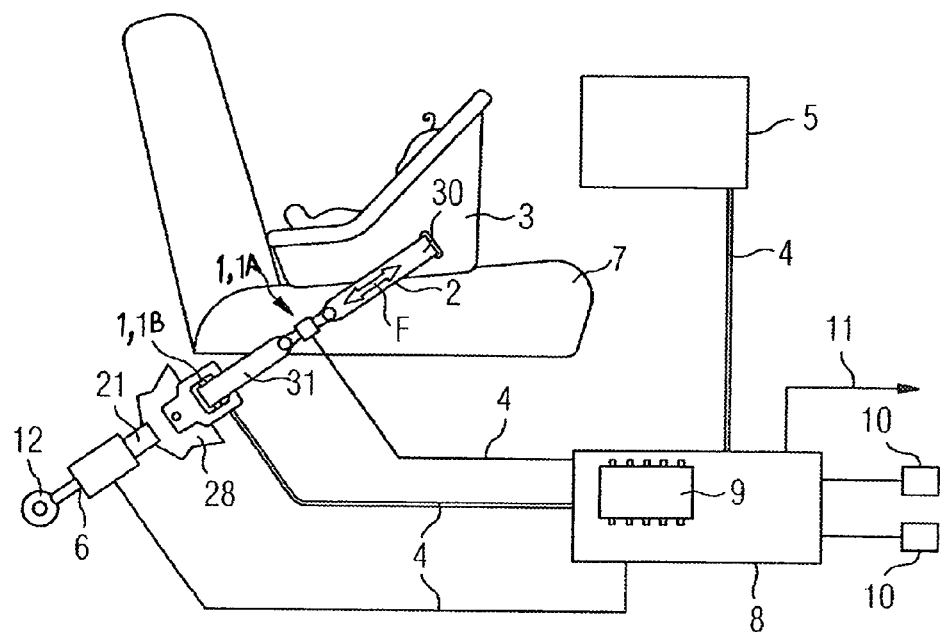
FIG. 1 shows a vehicle seat with a safety belt.

FIG. 1 shows a vehicle seat 7 with a safety belt 2, called belt 2 for short in the text which follows, as is usually used in passenger cars but also in heavy goods vehicles and buses. Furthermore, vehicle seats 7 of this type can also be found in rail-bound vehicles, aircraft and high-speed watercraft. The belt force measuring device 1 arranged at location 1A or 1B according to the invention can be used in all of these vehicles. FIG. 1 shows a child seat 3 on the vehicle seat 7, said child seat being secured by the belt 2. Instead of the child seat 3, it is of course also feasible for a grown person to be secured on the seat 7 by the belt 2. In the event of a traffic accident, considerable accelerations which have to be captured by the belt 2 are produced, with the belt 2 having to absorb up to 20 KN under full load. In order to protect the vehicle occupants, who are strapped in, to the maximum extent and in the process to be able to optimally control systems such as the airbag 5 or the belt pretensioner 6, a belt force measuring device 1 is formed in the belt lock 28.

Furthermore, a second mechanical connection element 21 which connects a measuring spring 16 which is arranged in the belt lock 28 to the belt pretensioner 6 is shown on the belt lock 28. The belt pretensioner 6 is, in turn, firmly connected to the body of the motor vehicle (not illustrated here) by means of a further mechanical mounting element 12. In the event of the vehicle being involved in an accident, the belt force measuring device 1 senses the force F acting on the belt 2 and it forwards the information about the active force F to the control device 8 via the electrical lines 4. The control device 8 contains a microcontroller 9 which determines the optimum triggering time for the airbag 5 and actuates the belt pretensioner 6 on the basis of the established belt force F and any additional information from further sensors 10. The available information can be used to control further vehicle components via an electrical connection 11 to further vehicle electronics (not illustrated here).

Furthermore, FIG. 1 shows that the belt force measuring device 1 according to one embodiment of the invention can be positioned between a first belt section 30 and a second belt section 31 over the course of the belt 2.

Figure 2:
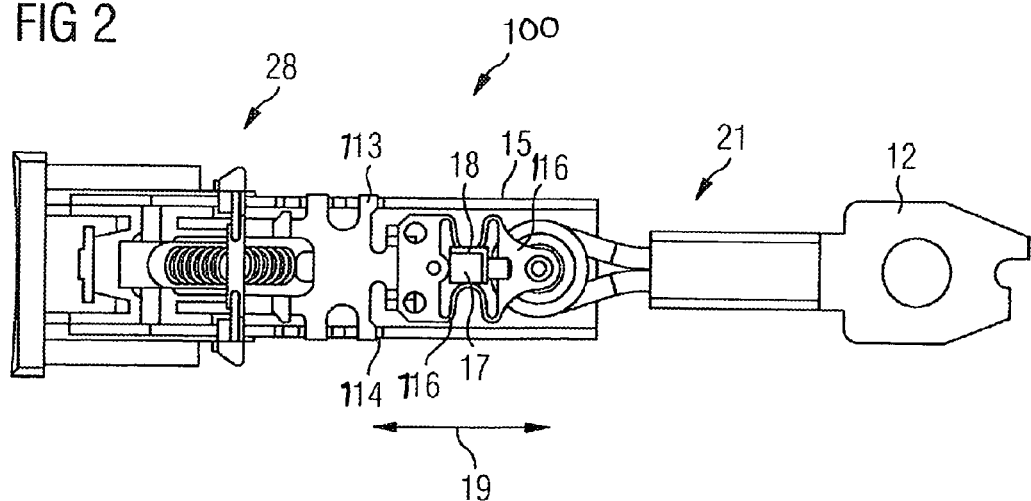
FIG. 2 shows a belt force measuring device according to the prior art.

FIG. 2 shows a belt force measuring device 100 according to the prior art. The belt force measuring device 100 is integrated in a belt lock 28. Shown first is a housing 15 of the belt lock 28 in which a measuring spring 116 is arranged. In this case, the measuring spring 116 is in the form of a metal spring and is connected to the vehicle body (not illustrated here) via a connection element 21 and the mounting element 12. The measuring spring 116 has an associated sensor element 17 and an associated transmitter 18. The sensor element 17 is generally in the form of a Hall sensor or a magnetoresistive sensor. However, any sensor element which detects a transmitter field can be used. In this case, the transmitter 18 is in the form of a permanent magnet. However, other field-generating transmitters can be used equally well. The sensor elements 17 and transmitters 18 which can be used in this case can likewise be used in the belt force measuring devices 1 described in FIGS. 1 and 3 to 7.

The sensor element 17 and the transmitter 18 are connected to the measuring spring 16 at various points. In the event of a force acting on the belt force measuring device 100, the measuring spring 116 deforms and there is a resulting relative movement between the sensor element 17 and the transmitter 18, which relative movement is detected by the sensor element 17 and is converted into an electrical signal. The expansion 19 of the measuring spring 116 is proportional to the force F acting on the belt 2. The signal detected by the sensor element 17 is therefore proportional to the belt force F and can be directly used to control the airbag 5 and the belt pretensioner 6 with the aid of the control device 8.

FIG. 2 also shows a first connection element 113 which connects the measuring spring 116 to the belt lock 28 and which is moved toward a stop 114 under the action of the belt force F when the expansion 19 of the measuring spring 116 has reached its maximum. When a certain maximum force is exceeded, it is no longer expedient to determine the belt force F since the occupant protection systems, such as airbag 5 and belt pretensioner 6, would have to have been triggered by that point in any case in order to protect the vehicle occupants. Starting from this maximum force, it is only a question of whether the belt 2 restrains the vehicle occupants securely. However, up until this maximum force is reached, it is extremely expedient to measure the belt force F in order to be able to protect the vehicle occupants to the optimum extent. When the maximum force is reached, the first connection element 113 is supported against the stop 114, as a result of which the measuring spring 116 cannot expand further. The belt force measuring device 1 according to the invention is described in greater detail in the following figures.

FIG. 3 shows the belt force measuring device 1 in its unfolded form as a stamped sheet metal part. The measuring spring 16 is shown in the central region of the belt force measuring device 1. The measuring spring 16 deforms under the belt force F which is passed from the first connection element 13 to the second connection element 21 via the measuring spring 16. The first connection element 13 and the second connection element 21 each have a lug 22 by which the connection elements 13, 21 are connected, for example, to the first belt section 30 and the second belt section 31. It goes without saying that it is also possible, for example, to connect the first connection element 13 to a vehicle body (not illustrated here) and to connect the second connection element 21 to the belt lock 28 known from FIG. 2. The expansion 19 of the measuring spring 16 is indicated by the expansion arrow. Furthermore, FIG. 3 shows a stop 14 and stop elements 29 whose function is explained in FIG. 4. FIG. 3 clearly shows that the measuring spring 16, the first connection element 13 and the second connection element 21 are integrally formed from a stamped sheet metal part. The stamped sheet metal part can be produced in a very simple and cost-effective manner.

FIG. 4 shows the belt force measuring device 1 known from FIG. 3 in its folded state. To achieve this, the flat stamped sheet metal part known from FIG. 3 was folded twice. A first fold 24 and a second fold 25 to position the stop elements 29 at a corresponding distance from the stop 14. A space which corresponds to the expansion path of the measurement spring 16 is made between the stop 14 and the stop elements 29. If a force F is now exerted on the measuring spring 16 via the first connection element 13 and the second connection element 21, this measuring spring deforms until the stop element 29 strikes the stop 14 and therefore prevents further deformation of the measuring spring 16. The entire system is formed in such a way that the measuring spring 16 has undergone its maximum expansion 19 by the time the stop elements 19 have reached the stop 14. After this maximum force is exceeded, it is not expedient to run a further belt force measurement operation. The stop element 29 on the stop 14 therefore holds the belt force measuring device in a position which cannot be changed any further.

FIG. 3 and FIG. 4 clearly show that the entire belt force measuring device with its measuring spring 16 and the first connection element 13 and the second connection element 21 are integrally formed and can be finally assembled to form a belt force measuring device 1 by means of a relatively simple folding process. Forming the belt force measuring device 1 in this way results in a very simple production process and therefore very low production costs. Assembly of the belt force measuring device 1 from an individual measuring spring 16 and a first connection element 13 and a second connection element 21 is not necessary here. Final assembly of the belt force measuring device shown in FIG. 3 and FIG. 4 with a sensor element 17 and a transmitter 18 is illustrated in FIGS. 5 and 6.

Figure 5:
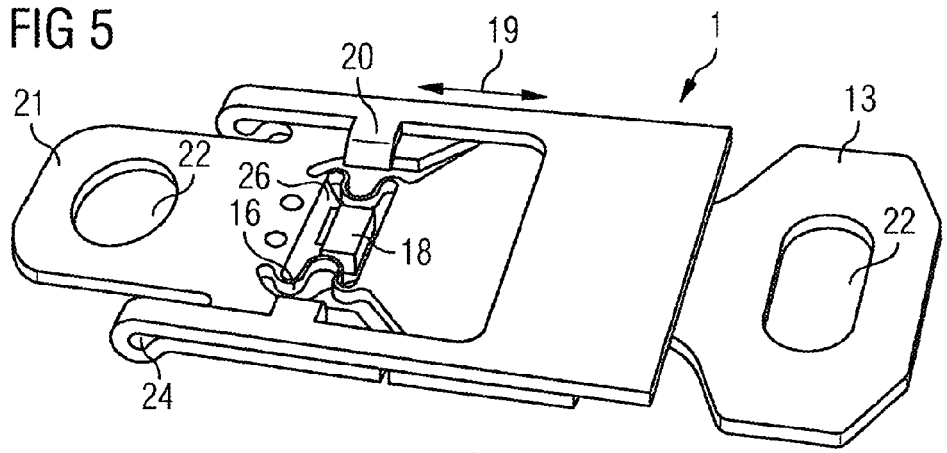
FIG. 5 shows the belt force measuring device known from FIG. 4 with its measuring spring and the first connection element and also the second connection element.

FIG. 5 shows the belt force measuring device 1 known from FIG. 4 with its measuring spring 16 and the first connection element 13 and the second connection element 21. The first fold 24 is also shown. The second fold 25 is not illustrated here, but it can be designed analogously to FIG. 4. The transmitter housing 26 in which the transmitter 18 is arranged is shown in the measuring spring 16. The transmitter may be, for example, a permanent magnet, but any other field-generating system can be integrated in the transmitter housing 26 in this case. FIG. 5 also shows a guide element 20 which guides the movement of the stop elements 29, for the purpose of force treatment, from the first connection element 13 to the second connection element 21 via the measuring spring 16.

Figure 6:
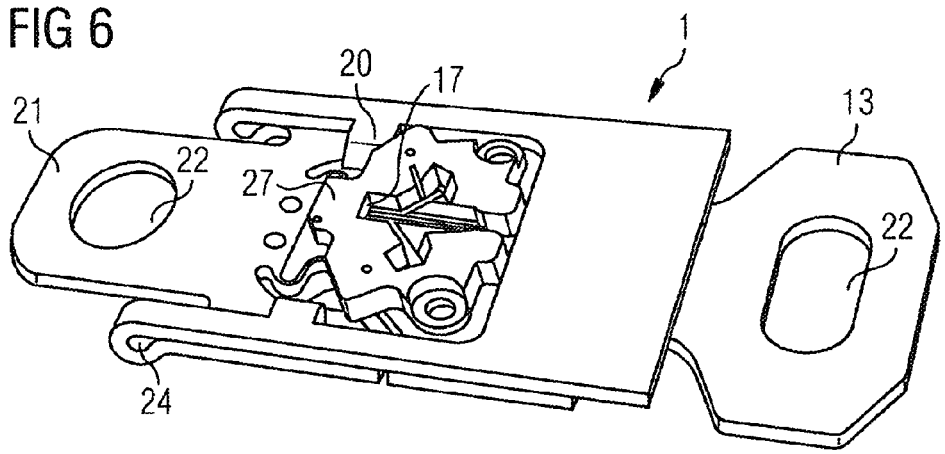
FIG. 6 shows the belt force measuring device known from FIG. 5, with the addition of a sensor housing.

FIG. 6 shows the belt force measuring device 1 known from FIG. 5 with the addition of a sensor housing 27 in which the sensor element 17 is arranged. The sensor element 17 generally used is a Hall sensor or a magnetoresistive sensor, it being possible in this case to use any sensor element which detects a transmitter field.

Figure 7:
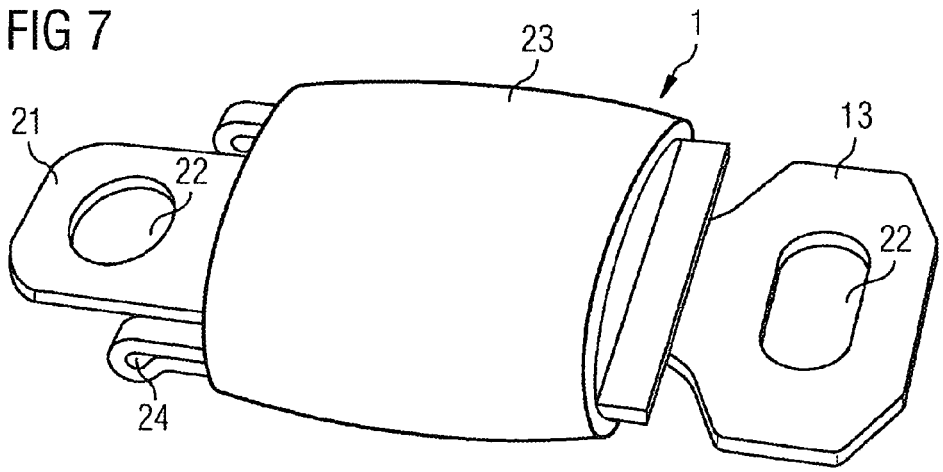
FIG. 7 shows the belt force measuring device known from FIG. 6 with an encapsulation 23 comprising thermoplastic material.

Finally, FIG. 7 shows the belt force measuring device 1 known from FIG. 6 with its first connection element 13 and its second connection element 21 and the first fold 24, with an encapsulation 23 comprising thermoplastic material surrounding the measuring spring 16, the transmitter housing 26 and the sensor housing 27. This encapsulation 23 comprising thermoplastic material protects the sensor element 17 and the transmitter 18 and also the measuring spring 16 against external influences.

The belt force measuring device illustrated here in FIGS. 3 to 7 can be produced in an extremely cost-effective manner as a stamped sheet metal part; it provides excellent measurement results and furthermore is very robust and has a long service life. The belt force measuring device 1 according to FIGS. 3 to 7 can be used at an extremely wide variety of points in the force flux within the belt 2. Examples of this are shown in FIG. 1 where the belt force measuring device 1 is integrated in the belt lock 28 in one case and secondly is connected to a belt section 30 and a second belt section 31 within the belt 2.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A belt force measuring device comprising:
  a measuring spring, wherein a deflection of the measuring spring corresponds to a belt force;
  a transmitter associated with the measuring spring;
  a sensor element associated with the measuring spring, the sensor element configured such that the deflection of the measuring spring causes a change in position of the sensor element relative to the transmitter, said sensor element sensing said change;
  a first connection element configured to connect the measuring spring to one of a belt lock and a first belt section; and
  a second connection configured to connect the measuring spring to one of a vehicle body, a component on the vehicle body, and a second belt section, wherein the measuring spring, the first connection element, and the second connection element are formed as an integral component consisting of a single continuous piece of material.

2. The belt force measuring device according to claim 1, wherein the single continuous piece of material is a stamped sheet metal part and the measuring spring, the first connection element, and the second connection element are integrally formed a from the stamped sheet metal part.

3. The belt force measuring device according to claim 2, wherein the stamped sheet metal part further comprises a first fold.

4. The belt force measuring device according to claim 2, wherein the first connection element further comprises a first lug.

5. The belt force measuring device according to claim 2, wherein the second connection element comprises a second lug.

6. The belt force measuring device according to claim 2, further comprising a stop formed on the stamped sheet metal part by a second fold, said stop configured to prevent the first and the second connection elements from further moving relative to each after a predetermined force is reached.

7. The belt force measuring device according to claim 2, further comprising a guide formed on the stamped sheet metal part by a fold, the guide configured to allow the first and the second connection elements to move relative to one another in a guided manner.

8. The belt force measuring device according to claim 2, wherein the stamped sheet metal part is in the form of a leadframe on which at least one of the sensor element and evaluation electronics is arranged.

9. The belt force measuring device according to claim 8, further comprising a thermoplastic encapsulation configured to surrounded the stamped sheet metal part with the sensor element, and at least one of the transmitter and the evaluation electronics, wherein the thermoplastic encapsulation protects against external influences.

10. The belt force measuring device according to claim 6, wherein the predetermined force is a maximum force.

11. The belt force measuring device according to claim 2, wherein the transmitter is a permanent magnet.

12. The belt force measuring device according to claim 11, wherein the sensor element is one of a magnetoresistive sensor and a Hall effect sensor.

* * * * *